(12) United States Patent
Nakako et al.

(10) Patent No.: US 9,776,293 B2
(45) Date of Patent: Oct. 3, 2017

(54) EYEGLASS LENS PROCESSING APPARATUS

(71) Applicant: NIDEK CO., LTD., Gamagori, Aichi (JP)

(72) Inventors: Yuya Nakako, Toyota (JP); Ryoji Shibata, Toyokawa (JP); Motoshi Tanaka, Gamagori (JP); Hirokatsu Obayashi, Toyokawa (JP); Toshiro Matsumoto, Gamagori (JP)

(73) Assignee: NIDEK CO., LTD., Aichi (JP)

( * ) Notice: Subject to any disclaimer, the term of this patent is extended or adjusted under 35 U.S.C. 154(b) by 535 days.

(21) Appl. No.: 13/788,622

(22) Filed: Mar. 7, 2013

(65) Prior Publication Data

US 2013/0232774 A1    Sep. 12, 2013

(30) Foreign Application Priority Data

Mar. 9, 2012    (JP) ................................. 2012-052964

(51) Int. Cl.
  *B24B 9/14*    (2006.01)
  *B23Q 39/02*   (2006.01)
  (Continued)

(52) U.S. Cl.
  CPC ............... *B23Q 1/64* (2013.01); *B23Q 1/488* (2013.01); *B23Q 39/027* (2013.01); *B24B 9/146* (2013.01);
  (Continued)

(58) Field of Classification Search
  CPC ............ Y10T 29/5127; Y10T 29/5129; Y10T 29/5128; Y10T 29/511; B24B 13/0037;
  (Continued)

(56) References Cited

U.S. PATENT DOCUMENTS 2,493,206 A * 1/1950 Okey .................. B24B 13/0037
                                                    29/38 A
4,520,595 A * 6/1985 Diener ................. B23Q 39/042
                                                    29/38 C
(Continued)

FOREIGN PATENT DOCUMENTS

CN         1449891 A    10/2003
CN       101337281 A     1/2009
(Continued)

OTHER PUBLICATIONS

Machine Translation of DE 102008004172, which DE '172 was published Jul. 2009.*

(Continued)

*Primary Examiner* — Erica E Cadugan
(74) *Attorney, Agent, or Firm* — Sughrue Mion, PLLC

(57) ABSTRACT

An eyeglass lens processing apparatus for processing a periphery of an eyeglass lens includes: a lens chuck shaft configured to chuck the eyeglass lens; a shaft angle changing portion configured to change a shaft angle of the lens chuck shaft; a first processing tool unit including at least one spindle at which a first processing tool is provided; a second processing tool unit that is disposed to oppose the first processing tool unit and that includes at least one spindle at which a second processing tool is provided; and a controller configured to change one of the first and second processing tool unit to be used for processing the eyeglass lens to the other of the first and second processing tool by controlling driving of the shaft angle changing portion to change the shaft angle of the lens chuck shaft.

7 Claims, 11 Drawing Sheets

(51) Int. Cl.
- B23Q 1/48 (2006.01)
- B23Q 11/10 (2006.01)
- B23Q 1/64 (2006.01)
- B24B 27/00 (2006.01)
- B24B 41/00 (2006.01)
- B28D 1/14 (2006.01)
- G05B 19/401 (2006.01)
- G05B 19/4093 (2006.01)
- B23Q 17/20 (2006.01)
- B23Q 39/00 (2006.01)
- B23Q 11/00 (2006.01)

(52) U.S. Cl.
CPC .......... *B24B 9/148* (2013.01); *B24B 27/0069* (2013.01); *B24B 27/0076* (2013.01); *B24B 41/005* (2013.01); *B28D 1/143* (2013.01); *G05B 19/401* (2013.01); *G05B 19/40938* (2013.01); *B23Q 11/005* (2013.01); *B23Q 11/10* (2013.01); *B23Q 17/20* (2013.01); *B23Q 2039/006* (2013.01); *G05B 2219/45157* (2013.01); *Y02P 90/265* (2015.11); *Y10T 29/511* (2015.01); *Y10T 29/5127* (2015.01); *Y10T 29/5128* (2015.01); *Y10T 29/52* (2015.01)

(58) Field of Classification Search
CPC .. B23Q 39/025; B23Q 39/026; B23Q 39/027; B23Q 1/488; G05B 2219/45157
USPC ................ 29/38 R, 38 B, 38 A, 28; 451/256
See application file for complete search history.

(56) References Cited

U.S. PATENT DOCUMENTS

| | | | |
|---|---|---|---|
| 4,829,716 A * | 5/1989 | Ueda | B24B 13/0031 279/158 |
| 6,062,947 A | 5/2000 | Obayashi et al. | |
| 6,298,531 B1 * | 10/2001 | Baumbusch | B23Q 1/015 29/36 |
| 9,475,242 B2 * | 10/2016 | Yamamoto | B29D 11/00961 |
| 2002/0006764 A1 * | 1/2002 | Hanisch | B23Q 1/52 451/1 |
| 2003/0214627 A1 | 11/2003 | Samukawa | |
| 2006/0240747 A1 | 10/2006 | Natsume et al. | |
| 2007/0015440 A1 | 1/2007 | Natsume | |
| 2009/0011688 A1 | 1/2009 | Schafer et al. | |
| 2010/0093265 A1 | 4/2010 | Lemaire et al. | |
| 2014/0297016 A1 * | 10/2014 | Yamamoto | B29D 11/00961 700/109 |
| 2015/0004884 A1 * | 1/2015 | Obayashi | B24B 9/148 451/256 |

FOREIGN PATENT DOCUMENTS

| | | |
|---|---|---|
| DE | 19504368 A1 | 8/1996 |
| DE | 19751750 A1 | 6/1999 |
| DE | 102008004172 A1 * | 7/2009 |
| EP | 0 890 414 A2 | 1/1999 |
| EP | 1 510 290 A1 | 3/2005 |
| EP | 2 011 603 A1 | 1/2009 |
| JP | 2000218487 A | 8/2000 |
| JP | 2005-74560 A | 3/2005 |
| JP | 2006-281367 A | 10/2006 |
| JP | 2006-305698 A | 11/2006 |
| JP | 2009-12178 A | 1/2009 |

OTHER PUBLICATIONS

Search Report, Issued by the European Patent Office, dated Oct. 13, 2014, in counterpart European application No. 13001157.0.
Communication dated Dec. 22, 2015, from the Japanese Patent Office in counterpart application No. 2012-052964.
Communication dated Nov. 16, 2016 issued by The State Intellectual Property Office of the People's Republic of China in counterpart Chinese Application No. 201310074707.2.

* cited by examiner ize_backing
EYEGLASS LENS PROCESSING APPARATUS

BACKGROUND

The present invention relates to an eyeglass lens processing apparatus that cuts the periphery of an eyeglass lens.

Eyeglass lens processing apparatuses are widely known which have plural processing tools disposed therein and which cut an eyeglass lens for a short time.

For example, as an eyeglass lens processing apparatus that processes an eyeglass lens using plural processing tools, an eyeglass lens processing apparatus for performing a processing process while interchanging processing tools depending on the processing type, such as a tool change type, is known (see JP-A-2000-218487).

SUMMARY

However, in the eyeglass lens processing apparatus according to the related art, since the processing process is performed while interchanging various processing tools through the use of a tool change, it is very difficult to control the processing apparatus. Since it is necessary to drive various processing tools by the use of a single spindle (spindle motor), it is very difficult to control the processing apparatus.

The invention is made in consideration of the problem in the related art and an object thereof is to provide an eyeglass lens processing apparatus which can easily perform processing of an eyeglass lens.

In order to achieve the above-mentioned object, the invention has the following configurations.

(1) An eyeglass lens processing apparatus for processing a periphery of an eyeglass lens, the eyeglass lens processing apparatus comprising:
a lens chuck shaft configured to chuck the eyeglass lens;
a shaft angle changing portion configured to change a shaft angle of the lens chuck shaft;
a first processing tool unit including at least one spindle at which a first processing tool is provided;
a second processing tool unit that is disposed to oppose the first processing tool unit and that includes at least one spindle at which a second processing tool is provided; and
a controller configured to change one of the first and second processing tool unit to be used for processing the eyeglass lens to the other of the first and second processing tool by controlling driving of the shaft angle changing portion to change the shaft angle of the lens chuck shaft.

(2) The eyeglass lens processing apparatus according to (1), wherein the controller performs a predetermined processing process by adjusting a tilt angle of the lens chuck shaft with respect to the first processing tool unit and the second processing tool unit when processing the eyeglass lens by the use of the shaft angle changing unit.

(3) The eyeglass lens processing apparatus according to (1) or (2), wherein the shaft angle changing unit includes a rotating base that supports the lens chuck shaft so as to change the shaft angle of the lens chuck shaft, and rotates the rotating base around a central axis of the rotating base perpendicular to the lens chuck shaft.

(4) The eyeglass lens processing apparatus according to any one of claims 1 to 3, wherein the spindles of the first and second processing tool units are symmetry with respect to an opposing axis.

(5) The eyeglass lens processing apparatus according to any one of (4), wherein
the spindles of the first and second processing tool units are opposed to each other across an opposing axis, and
the spindles of the first and second processing tool units are tilted about the opposing axis.

(6) The eyeglass lens processing apparatus according to any one of (1) to (5), wherein at least one of the first and second processing tool units includes a plurality of the spindles.

(7) The eyeglass lens processing apparatus according to any one of (1) to (6), wherein
at least one of the first and second processing tool units includes at least two spindles,
the at least two spindles of the at least one of the first and second processing tool units are arranged in a vertical direction of the eyeglass lens processing apparatus,
the spindle arranged at a lowest position among the at least two spindles of the at least one of the first and second processing tool units is provided with a processing tool for roughing.

(8) The eyeglass lens processing apparatus according to any one of (1) to (6), wherein
at least one of the first and second processing tool units includes at least two spindles,
the at least two spindles of the at least one of the first and second processing tool units are arranged in a vertical direction of the eyeglass lens processing apparatus,
the spindle arranged at a lowest position among the at least two spindles of the at least one of the first and second processing tool units is provided with a processing tool requiring a supply of water.

According to the invention, it is possible to provide an eyeglass lens processing apparatus which can easily perform processing of an eyeglass lens.

DESCRIPTION OF EXEMPLARY EMBODIMENTS

<General Description>

Figure 1:
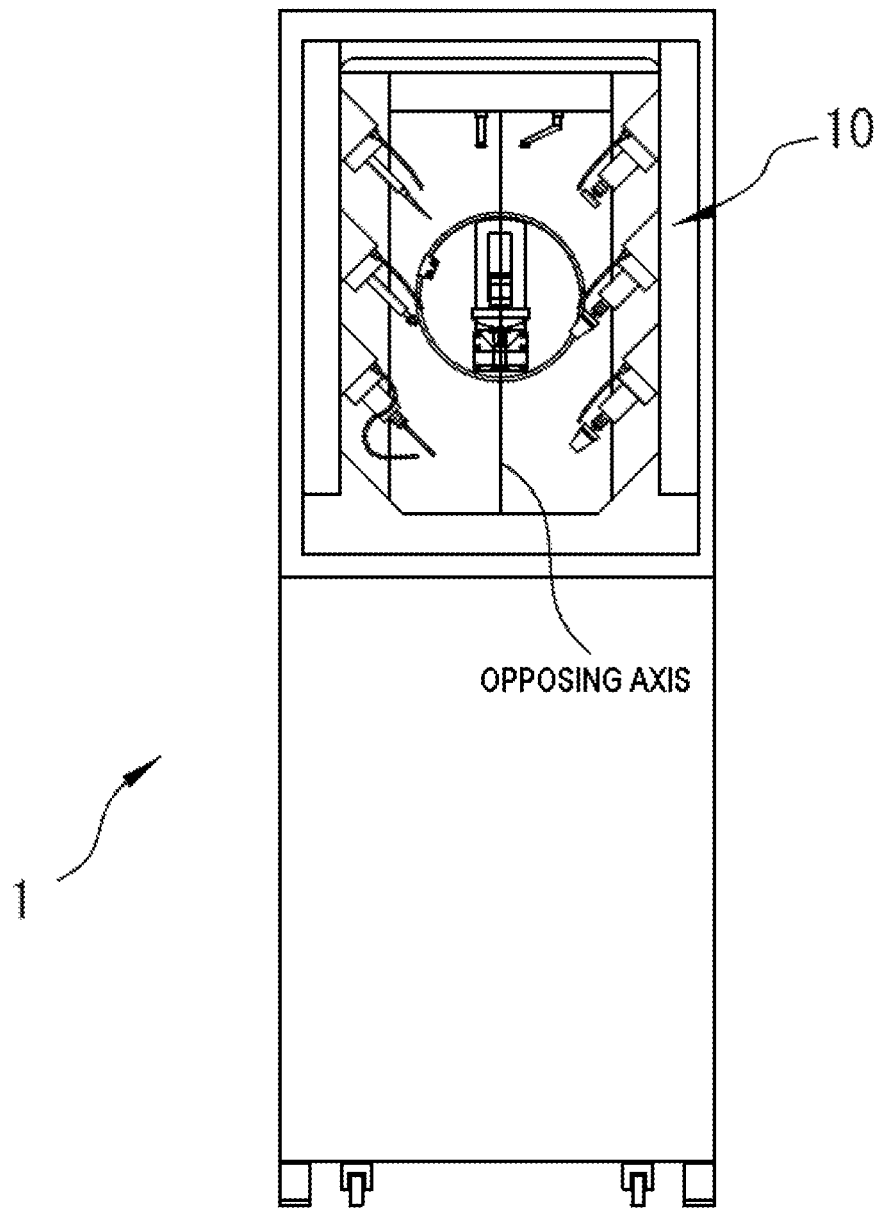
FIG. 1 is a diagram schematically illustrating the configuration of an apparatus body of an eyeglass lens processing apparatus.

An apparatus according to an exemplary embodiment has plural spindles installed therein and performs processing an eyeglass lens by changing the relative position between the eyeglass lens and processing tools. Accordingly, it is possible to easily perform processing of an eyeglass lens.

Hereinafter, an apparatus according to an exemplary embodiment will be described in brief with reference to the accompanying drawings. FIGS. 1 to 9 are diagrams illustrating the apparatus according to the exemplary embodiment. In the exemplary embodiment, the depth direction of the page in FIG. 2 (normal direction to the page) is defined as an X direction, the horizontal direction (lateral direction) is defined as a Z direction, and the vertical direction (up-and-down direction) is defined as a Y direction.

An eyeglass lens processing apparatus according to the exemplary embodiment is used to process the periphery of an eyeglass. The eyeglass lens processing apparatus includes a lens chuck shaft (chucking means) 22, a shaft angle changing unit (shaft angle driving means) 25, a first processing tool unit 40, a second processing tool unit 45, and a controller 70.

The lens chuck shaft 22 chucks an eyeglass lens by the use of a pair of lens chuck shaft 22L and lens chuck shaft 22R. The shaft angle changing means 25 is used to change the shaft angle of the lens chuck shaft 22. The controller 70 changes a processing tool to be used for processing of the eyeglass lens to the first processing tool unit 40 and the second processing tool unit 45 by controlling the driving of the shaft angle changing means 25 to change the shaft angle of the lens chuck shaft 22.

The controller 70 adjusts the tilt angle of the lens chuck shaft 22 with respect to the first processing tool unit 40 and the second processing tool unit 45 when processing of the eyeglass lens by the use of the shaft angle changing means 25. Accordingly, a predetermined processing process (such as finishing and polishing processes) can be suitably performed.

For example, the shaft angle changing means 25 includes a rotating base (carriage) 21 supporting the lens chuck shaft 22 so as to change the shaft angle of the lens chuck shaft 22. The lens chuck shaft 22 is supported by the carriage 21. The shaft angle changing means 25 rotates the carriage 21 around the central axis of the carriage 21 perpendicular to the lens chuck shaft 22.

<Configuration of Processing Unit>

The first processing tool unit 40 includes at least one spindle. The second processing tool unit 45 includes at least one spindle. The first processing tool unit 40 and the second processing tool unit 45 are disposed to oppose each other. A processing tool (tool) is provided at each spindle. The arrangement to oppose each other means that the spindles of both the first processing tool unit 40 and the second processing tool unit 45 have only to be disposed to face each other. For example, the arrangement to oppose each other includes an arrangement in which both spindles are disposed to be tilted.

For example, the spindles of the first processing tool unit 40 and the second processing tool unit 45 are disposed to be tilted about an opposing axis across which the first processing unit 40 and the second processing unit 45 are opposed to each other (see FIG. 1). In this case, the spindles of the first processing tool unit 40 and the second processing tool unit 45 are symmetry with respect to the opposing axis.

For example, the spindles of the first processing tool unit 40 and the second processing tool unit 45 are disposed to be tilted in the downward direction (the direction of gravitational force). The tilt direction is not limited to this direction. For example, the spindles may be tilted in the upward direction. By employing this configuration, the width of the apparatus can be reduced, thereby resulting in space saving.

Regarding the first processing tool unit 40 and the second processing tool unit 45, at least two spindles may be disposed in at least one processing unit of the first processing tool unit 40 and the second processing tool unit 45.

For example, two or more spindles are arranged along the opposing axis of the first processing tool unit 40 and the second processing tool unit 45. In this case, plural spindles may be arranged in the Y-axis direction or may be arranged in the X-axis direction.

Examples of the processing tool provided at each spindle include a drilling tool, a grooving tool, a processing tool for roughing (roughing tool), a processing tool for polishing (polishing tool), a finishing tool, and a processing tool for stepping. Other types of processing tools may be used.

Regarding installation of a processing tool, for example, a processing tool for roughing is provided at the lowest spindle out of plural spindles of at least one of the first processing tool unit 40 and the second processing tool unit 45.

A processing tool requiring a supply of water is provided at the lowest spindle out of plural spindles of at least one processing tool unit of the first processing tool unit 40 and the second processing tool unit 45. An example of the processing tool requiring a supply of water is a polishing tool.

In this way, by disposing a processing tool generating large chips or water in the lowest spindle, it is possible to prevent chips or water from being contacted with or attached to other processing tools with a simple structure and thus to reduce the possibility of influence on driving of other processing tools.

EXAMPLES

Examples of the exemplary embodiment will be described below with reference to the accompanying drawings. FIG. 1 is a diagram schematically illustrating the configuration of the apparatus body of the eyeglass lens processing apparatus according to the exemplary embodiment. A lens processing unit 10 that processes a lens is disposed in the upper part of the eyeglass lens processing apparatus 1.

Figure 2:
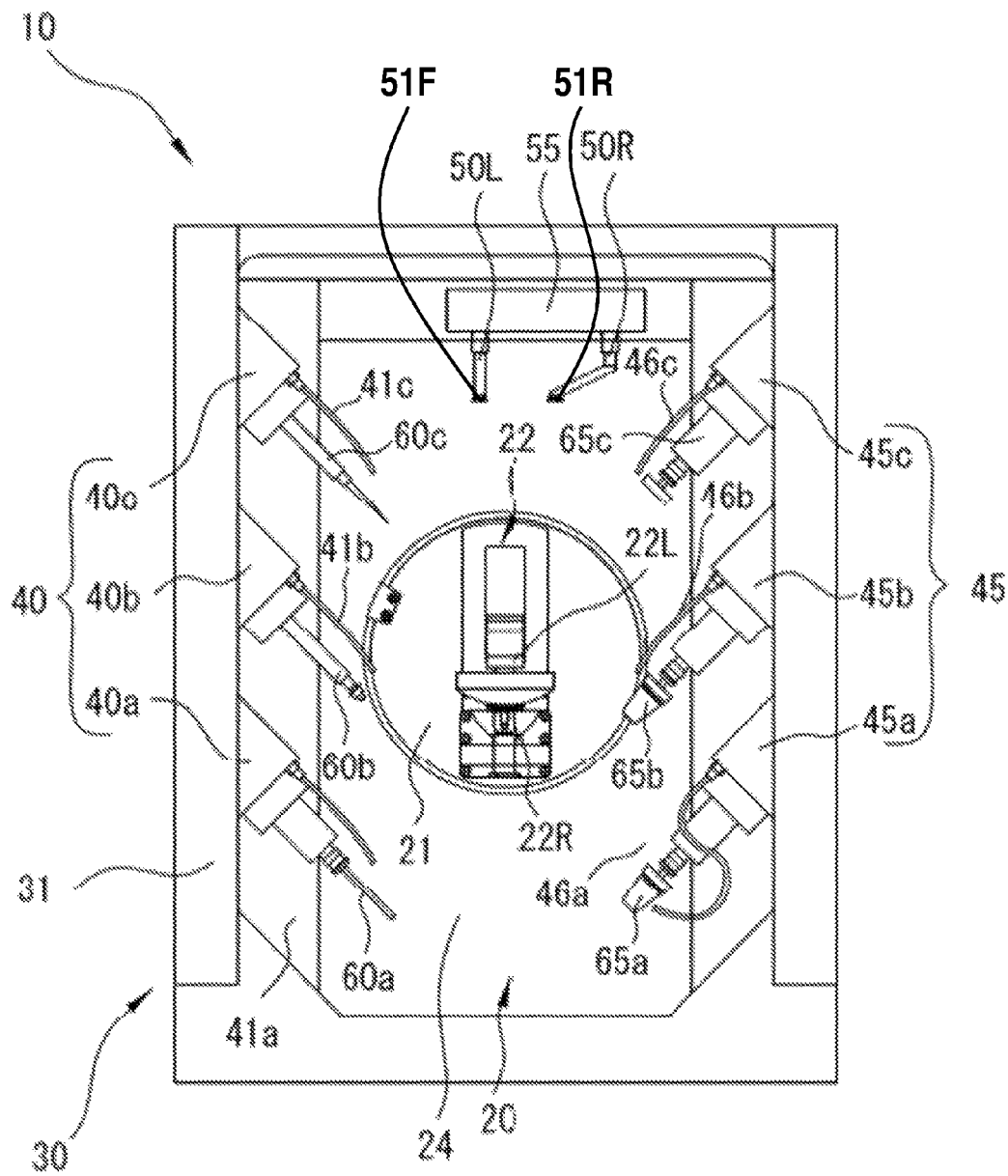
FIG. 2 is a diagram schematically illustrating the configuration of a lens processing unit.

FIG. 2 is a diagram schematically illustrating the configuration of the lens processing unit 10. The configuration of the lens processing unit 10 will be described below. The lens processing unit 10 includes a lens chuck unit 20 and a spindle support unit 30.

<Lens Chuck Unit>

The lens chuck unit 20 serves to support an eyeglass lens LE and to move the eyeglass lens LE relative to the spindle support unit 30. The lens chuck unit 20 includes a carriage 21 and a base 24. The carriage 21 supports the lens chuck shafts 22L and 22R. The lens chuck shafts 22L and 22R are provided to chuck the eyeglass lens LE.

<Lens Chuck Shaft Rotating Mechanism>

Figure 3:
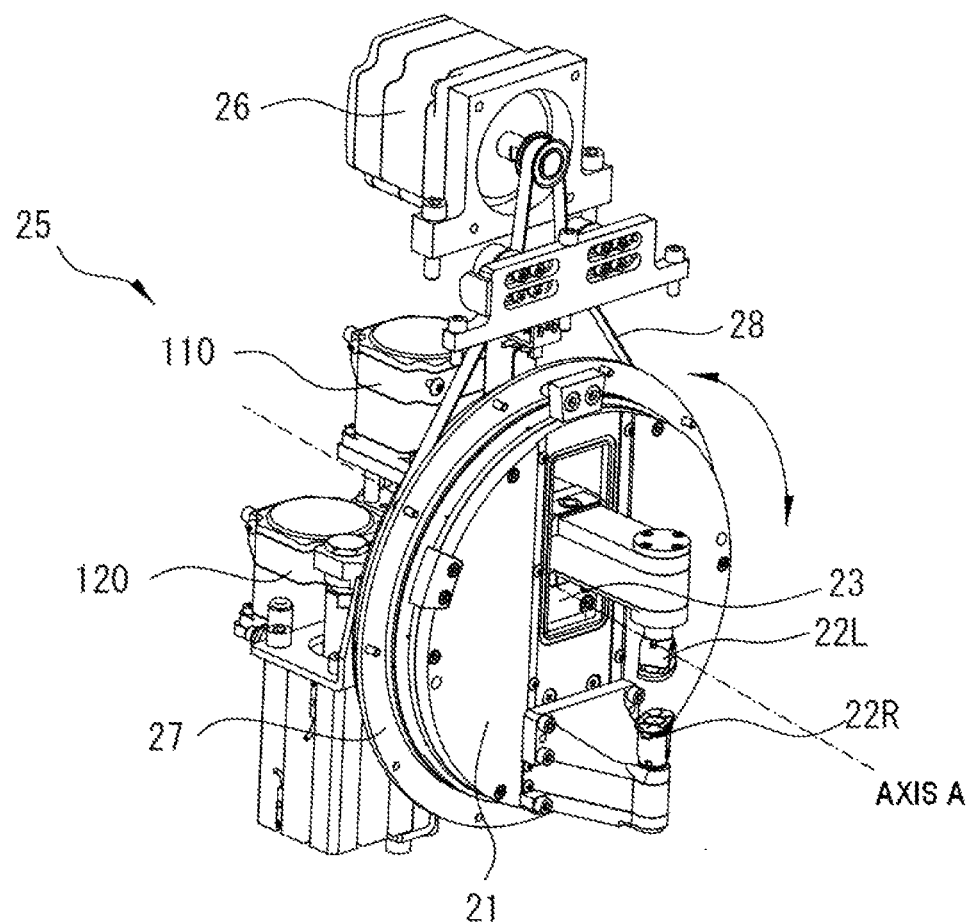
FIG. 3 is a diagram schematically illustrating the configuration of a lens chuck unit.

FIG. 3 is a diagram schematically illustrating the configuration of the lens chuck unit 20. A chuck table 23 that can move on two guide rails (not shown) extending in the lateral direction is disposed on the rear surface of the carriage 21. The chuck table 23 is fixed to the lens chuck shaft 22L. The chuck table 23 is provided with a pressure-drive source (not shown) that moves the chuck table 23 in parallel to the lens chuck shaft. The pressure-drive source includes an air pump, a valve, and a piston. The air pump is used to pump air. The piston is fixed to the chuck table 23. The valve is disposed in an enclosed space in which the piston is disposed. Introduction of air into the enclosed space is adjusted by opening and shutting the valve. The pressure-drive source moves the piston in parallel to the lens chuck shaft by adjusting the introduction of air into the enclosed space. Accordingly, the lens chuck shaft 22L along with the chuck table 23 moves to the lens chuck shaft 22R fixed to the carriage 21 in parallel. The eyeglass lens LE is chucked by the lens chuck shaft 22L and the lens chuck shaft 22R fixed to the carriage 21.

The lens chuck unit 20 is provided with a drive source (for example, a motor) 110. The motor 110 is used to rotate the lens chuck shaft 22L about the axis thereof. By the rotational driving of the motor 110, the lens chuck shaft 22L is rotated by the motor 110 through the use of a rotation transmitting mechanism such as a timing belt or a pulley.

The lens chuck unit 20 is provided with a drive source (for example, a motor) 120. The motor 120 is used to rotate the lens chuck shaft 22R about the axis thereof. By the rotational driving of the motor 120, the lens chuck shaft 22R is rotated by the motor 110 through the use of a rotation transmitting mechanism such as a timing belt or a pulley. Encoders for detecting the rotation angles of the lens chuck shafts 22L and 22R are mounted on the rotating shafts of the motors 110 and 120. The motors 110 and 120 are driven in synchronization with each other. That is, the lens chuck shafts 22L and 22R are rotationally driven in synchronization with each other. These elements constitute a chuck shaft rotating unit.

Figure 4A:
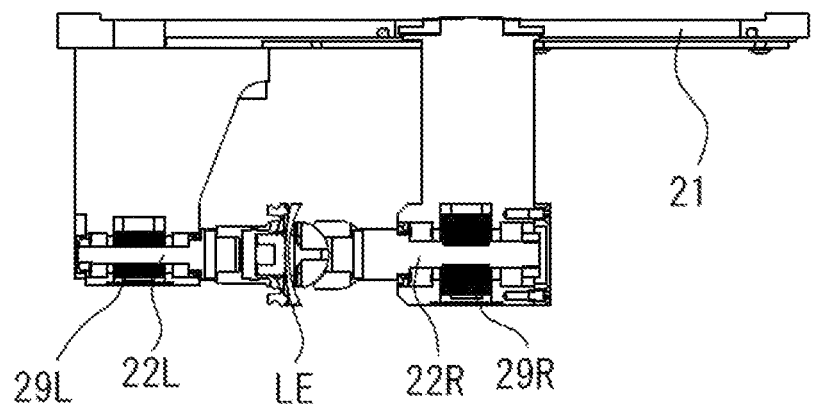
FIG. 4A is a cross-sectional view of a lens chuck shaft.
Figure 4B:
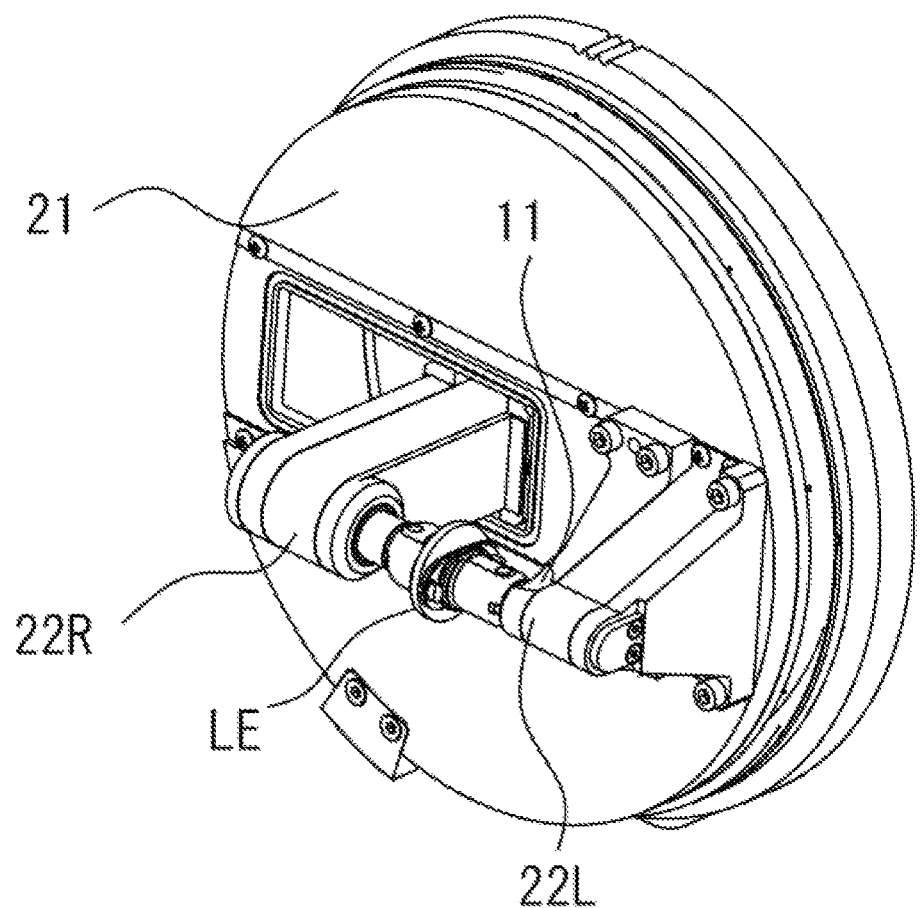
FIG. 4B is an oblique projection view of the lens chuck shaft.
Figure 4C:
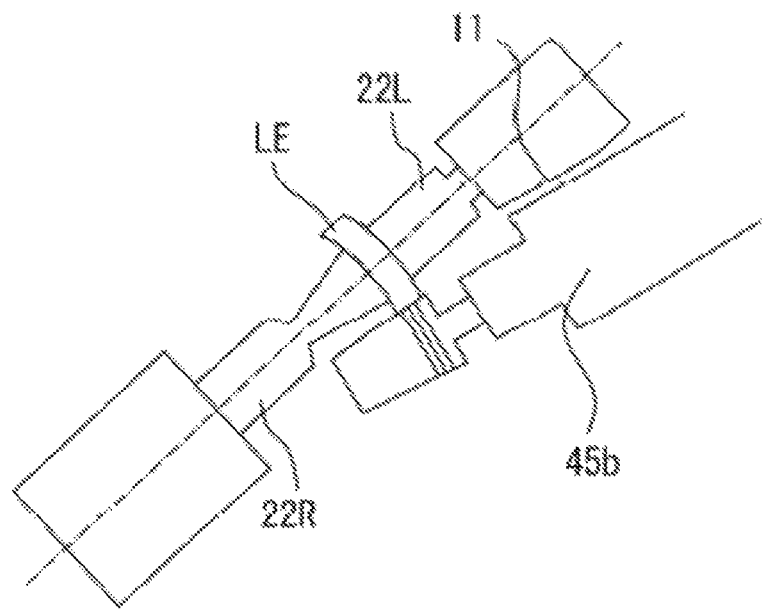
FIG. 4C is a diagram illustrating the relationship between lens chuck shafts and processing tools.

The configurations of the lens chuck shafts 22L and 22R will be described in more detail below. FIG. 4 is a diagram schematically illustrating the configuration of the lens chuck shaft 22. FIG. 4A shows a cross-sectional view of the lens chuck shaft 22. FIG. 4B shows an oblique projection view of the lens chuck shaft 22. FIG. 4C is a diagram illustrating the relationship between the lens chuck shaft 22 and a processing tool.

When processing an eyeglass lens, the lens chuck shaft 22L and the spindle approach each other. At this time, when the diameter of the lens chuck shaft 22L is large, the lens chuck shaft 22L comes in contact with the spindle and thus the processable range of an eyeglass lens is restricted. Accordingly, in this example, the size of the lens chuck shaft 22L approaching the spindle is reduced and a cutout 11 is formed in the lens chuck shaft 22L.

For example, the lens chuck shaft 22L is formed to have a diameter smaller than that of the lens chuck shaft 22R. Accordingly, the diameter of a bearing 29L disposed in the lens chuck shaft 22L is also small. When the lens chuck shaft 22L is rotationally driven, the bearing 29L is used to support the lens chuck shaft 22L so as to prevent the vibration of the lens chuck shaft 22L. The diameter of the bearing necessarily depends on the diameter of the lens chuck shaft. For example, when the diameter of the lens chuck shaft is large but the diameter of the bearing is not large, the lens chuck shaft is not stably supported. When the diameter of the bearing is small, the lens chuck shaft can be stably supported even by the bearing having a small diameter. That is, for the lens chuck shaft 22R having a diameter larger than that of the lens chuck shaft 22L, the diameter of the bearing 29R should be set to be larger than that of the bearing 29L.

A cutout 11 is formed in the lens chuck shaft 22L. For example, as shown in FIG. 4C, when a processing process is performed using the spindle 45b, the lens chuck shaft 22L and the spindle 40a can get closer to each other due to the cutout 11 formed in the lens chuck shaft 22. That is, regarding a portion in which the lens chuck shaft comes in contact with the spindle when the lens chuck shaft and the spindle get close to each other, such a contact is avoided by removing a part of the lens chuck shaft.

By employing this configuration, the lens chuck shaft 22 and the spindle can get closer to each other. Accordingly, it is possible to process an eyeglass lens up to a smaller diameter when processing the eyeglass lens.

When the diameter of the lens chuck shaft becomes smaller, warping or the like occurs in the lens chuck shaft at the time of processing of an eyeglass lens and it is not possible to precisely perform the processing of an eyeglass. Accordingly, the diameter of the lens chuck shaft 22R out of the lens chuck shafts 22L and 22R constituting the lens chuck shaft 22 is set to be larger than that of the lens chuck shaft 22L. Accordingly, when an eyeglass lens is chucked and rotationally driven by the use of the lens chuck shafts 22L and 22R, it is possible to stably rotate the eyeglass. As the lens chuck shaft becomes larger, the driving force becomes larger and thus an eyeglass under the lens processing can be stably moved. Accordingly, by setting one lens chuck shaft 22R to be larger than the other lens chuck shaft 22L, a predetermined driving force can be secured at the time of processing of an eyeglass lens and thus the eyeglass lens can be stably moved.

<Carriage Rotating Mechanism>

The lens chuck unit 20 is provided with a shaft angle changing mechanism (shaft angle changing means) 25. The shaft angle changing mechanism 25 is used to switch a processing tool or to adjust the relative position of an eyeglass lens and a processing tool at the time of processing of the eyeglass lens (details of which will be described later). The shaft angle changing mechanism 25 includes a driving source (for example, a motor) 26, a pulley 27, and a timing belt 28. The pulley 27 is fixed to the carriage 21. When the motor 26 is rotationally driven, the rotation of the motor 26 is transmitted to the pulley 27 via the timing belt 28. The carriage 21 is rotationally driven with the central axis (A axis) of the carriage 21 as a rotation center relative to the base 24 by the rotation of the pulley 27. Accordingly, with the rotational driving of the carriage 21, the shaft angle of the lens chuck shafts 22L and 22R are changed (rotated) about the A axis. In this example, the initial position of the carriage 21 at the time of starting the rotation is set to a position at which the axis direction of an eyeglass lens is parallel to the Y-axis direction when the eyeglass lens is chucked by the lens chuck shafts 22L and 22R (see S in FIG. 8A). At this time, the lens chuck shafts 22L and 22R are located so that the lens chuck shaft 22L is located on the upper side and the lens chuck shaft 22R is located on the lower side. That is, the concave surface (rear surface) of the eyeglass lens is located on the upper side and the convex lens (front surface) of the eyeglass lens is located on the lower side.

<X-axis and Z-axis Driving Mechanism>

Figure 5:
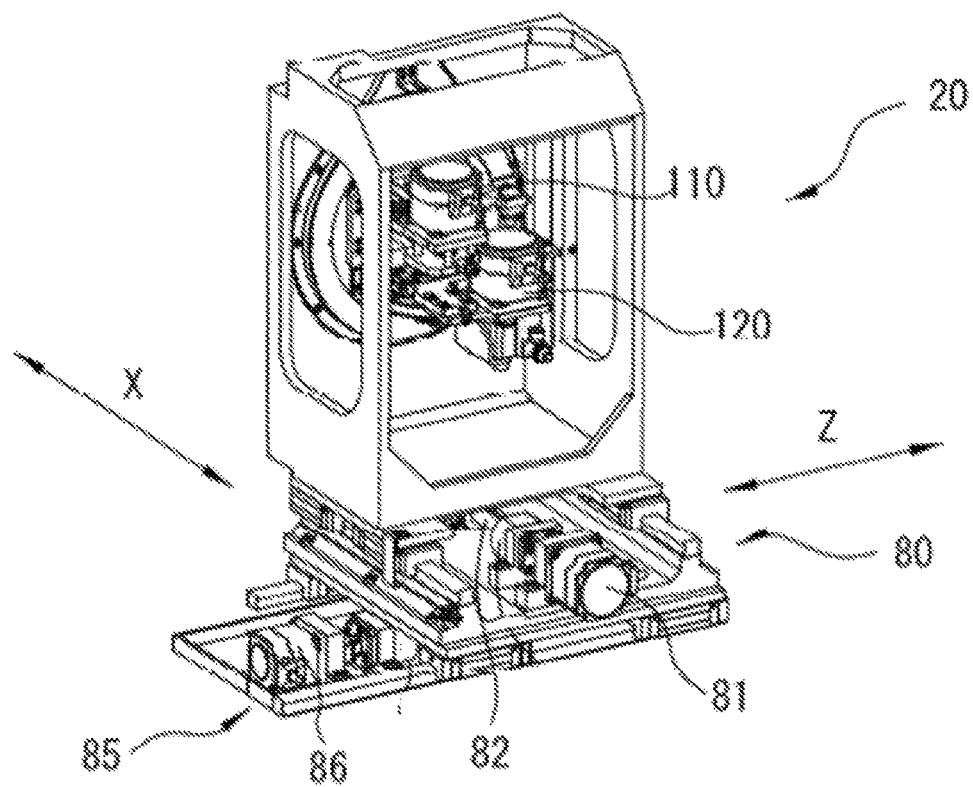
FIG. 5 is a diagram illustrating X-axis and Z-axis driving mechanisms of the lens chuck unit.

FIG. 5 is a diagram illustrating X-axis and Z-axis driving mechanisms of the lens chuck unit 20. The lens chuck unit 20 is provided with driving mechanisms (an X-axis driving mechanism 80 and a Z-axis driving mechanism 85) used to move the lens chuck unit 20 in the X direction and the Z direction relative to the spindle support unit 30, respectively.

The X-axis driving mechanism 80 includes a driving source (motor) 81. The motor 81 is directly connected to a shaft 82 extending in the X-axis direction. The rotating shaft of the motor 81 is provided with an encoder for detecting the movement position in the X-axis direction of the lens chuck unit 20. Threads are formed on the outer peripheral portion of the shaft 82. A moving member (for example, nut) (not shown) as a bearing is fitted to the end of the shaft 82. The lens chuck unit 20 is fixed to the moving member. When the motor 81 is rotationally driven, the lens chuck unit 20 moves along the shaft 82 extending in the X-axis direction. Accordingly, the lens chuck shafts 22L and 22R move linearly in the X-axis direction along with the carriage 21.

The Z-axis driving mechanism 85 includes a driving source (motor) 86. The motor 86 is directly connected to a shaft extending in the Z-axis direction. The rotating shaft of the motor 86 is provided with an encoder for detecting the movement position in the Z-axis direction of the lens chuck unit 20. Threads are formed on the outer peripheral portion of the shaft. A moving member (for example, nut) (not shown) as a bearing is fitted to the end of the shaft. The lens chuck unit 20 is fixed to the moving member. When the motor 86 is rotationally driven, the lens chuck unit 20 moves along the shaft extending in the Z-axis direction. Accordingly, the lens chuck shafts 22L and 22R move linearly in the Z-axis direction along with the carriage 21.

<Spindle Support Unit>

The spindle support unit 30 includes a movement support base 31, a first processing tool unit 40 and a second processing tool unit 45 disposed on the left and right side surfaces thereof, and lens shape detecting units 50L and 50R. The first processing tool unit 40 and the second processing tool unit 45 are disposed on the left and right side surfaces of the movement support base 31.

<Processing Unit>

As shown in FIG. 2, the first processing tool unit 40 is disposed on the left side surface of the movement support base 31 and includes three spindles (processing tool rotating shafts) 40a, 40b, and 40c. The second processing tool unit 45 is disposed on the right side surface of the movement support base 31 and includes three spindles 45a, 45b, and 45c. Processing tools 60a, 60b, and 60c are coaxially mounted on the spindles 40a, 40b, and 40c of the first processing tool unit 40, respectively. Processing tools 65a, 65b, and 65c are coaxially mounted on the spindles 45a, 45b, and 45c of the second processing tool unit 45, respectively. Each processing tool is used as a processing tool used for processing an eyeglass lens.

The spindles are provided with hoses 41a, 41b, 41c, 46a, 46b, and 46c for supplying air or water, respectively. The hoses 41a, 41b, 41c, 46a, 46b, and 46c are used to remove chips generated through the processing of an eyeglass lens by the use of air. The hose 46a is used to supply water to be used for processing an eyeglass lens. The hose can be arbitrarily interchanged depending on its application. For example, a water hose may be interchanged with an air hose.

Each spindle is disposed so as to tilt the tip of the spindle in the downward direction (the direction of gravitational force). In this example, the tilt angle of each spindle is set to 45° downward from the Z-axis direction (horizontal direction).

In this way, by arranging the spindles to be tilted, it is possible to reduce the possibility of accumulating chips or water in the corresponding processing tool and thus to prevent breakdown thereof. It is easy to remove chips or the like at the time of ejection of air.

By arranging the spindles to be tilted, the inter-tool width can be saved in comparison with a case where the spindles are arranged in the horizontal direction. Since the rotational driving in the shaft angle of the lens chuck shaft 22 can be reduced, it is possible to efficiently switch the first processing tool unit 40 and the second processing tool unit 45.

The processing tools 60a, 60b, and 60c are coaxially mounted on the spindles 40a, 40b, and 40c of the first processing tool unit 40, respectively. The processing tools 65a, 65b, and 65c are coaxially mounted on the spindles 45a, 45b, and 45c of the second processing tool unit 45, respectively. The processing tools are used as processing tools for processing an eyeglass lens LE. The spindles are rotationally driven by a driving source (for example, a motor) mounted on the movement support base 31 via a rotation transmitting mechanism disposed in each spindle.

For example, in this example, a cutter as a roughing tool is provided at the processing tool 60a. The roughing tool is used to cut an eyeglass lens LE. A cutter as a processing tool for grooving (grooving tool) is provided at the processing tool 60b. An end mill as a processing tool for drilling (drilling tool) is provided at the processing tool 60c. A grindstone as a polishing tool is provided at the processing tool 65a. The polishing tool is used to polish an eyeglass lens LE into a specular surface using water. A cutter having a conical shape as a finishing tool is provided at the processing tool 65b. The finishing tool is used to perform beveling or chamfering. A processing tool for stepping is provided at the processing tool 65c.

In this way, the roughing tool and the polishing tool are disposed in the lowest spindles 60a and 65a of the first processing tool unit 40 and the second processing tool unit 45, respectively. Accordingly, it is possible to easily suppress a reason for deteriorating the driving of other processing tools (spindles) or a reason of breakdown thereof. That is, chips or water generated at the time of processing of an eyeglass lens does not have an influence on other processing tools. Particularly, when the processing tool for roughing generates large chips due to the cutting of a lens in a predetermined shape and causes a large influence on other processing tools due to attachment of the chips to other processing tools is used, this configuration is useful. When the processing tool for polishing requiring water is used, this configuration is also useful.

<Y-axis Driving Mechanism>

Figure 6:
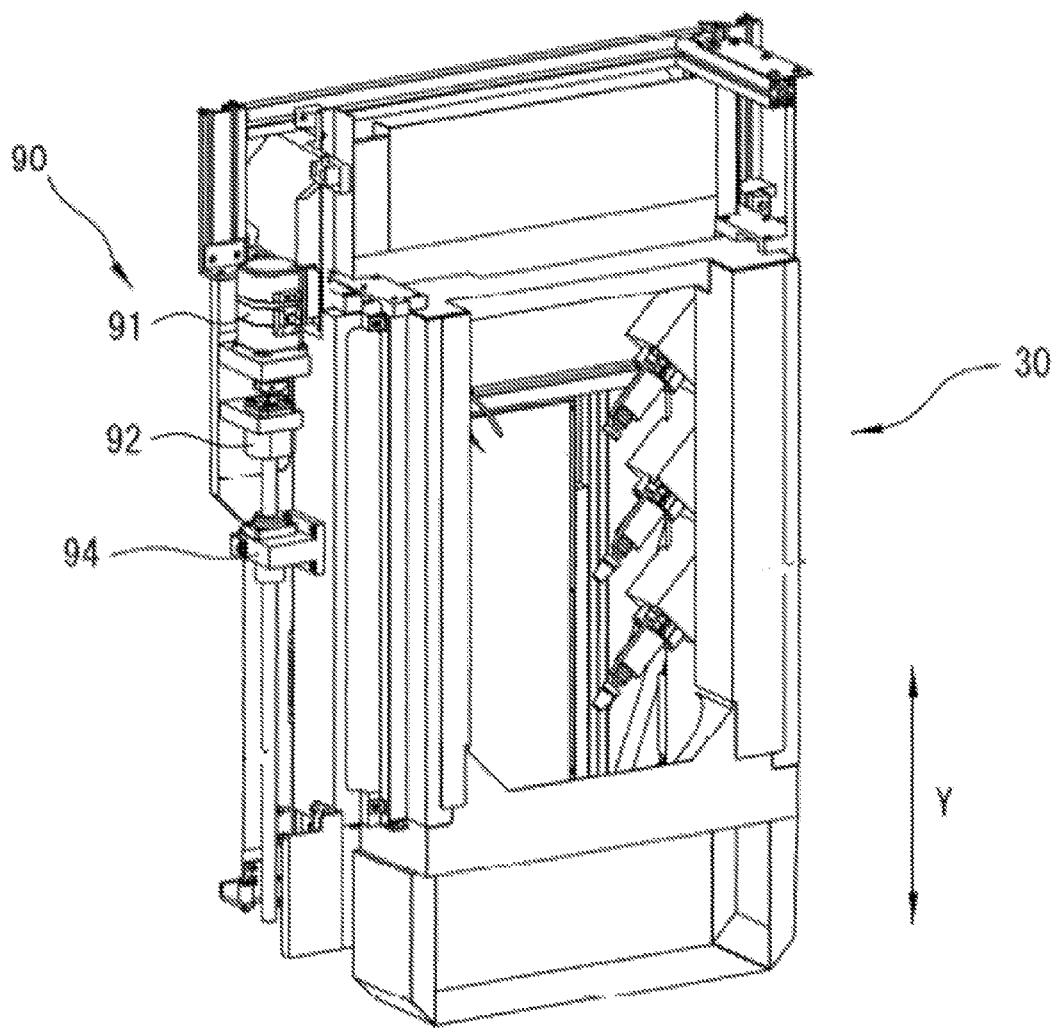
FIG. 6 is a diagram illustrating a Y-axis driving mechanism of a spindle support unit.

FIG. 6 is a diagram illustrating the Y-axis driving mechanism of the spindle support unit 30. The spindle support unit 30 is provided with a driving mechanism (Y-axis driving mechanism 90) for causing the spindle support unit 30 to move in the Y-axis direction relative to the lens chuck unit 20.

The Y-axis driving mechanism 90 includes a driving source (motor) 91. The rotating shaft of the motor 91 is directly connected to a shaft 92 extending in the Y-axis direction. The motor 91 is provided with an encoder for detecting the movement position in the Y-axis direction of the spindle support unit 30. Threads are formed on the outer peripheral surface of the shaft. A moving member (for example, a nut) 94 as a bearing is fitted to an end of the shaft. The movement support base 31 is fixed to the moving member 94. When the motor 91 is rotationally driven, the movement support base 31 moves along the shaft extending in the Y-axis direction. Accordingly, the spindle support unit 30 moves linearly in the Y-axis direction. A spring (not shown) is hooked on the movement support base 31 and serves to cancel the downward load of the movement support base 31 to facilitate the movement.

<Lens Shape Detecting Unit>

In FIG. 2, lens shape detecting units (lens edge shape detecting units) 50L and 50R and a driving mechanism 55 of the lens shape detecting units are disposed above the carriage 21. The lens shape detecting unit 50L detects the position of the front lens surface (the front lens position of a target lens shape). The lens shape detecting unit 50R detects the position of the rear lens surface (the rear lens position of a target lens shape).

Tracing styluses 51F and 51R are fixed to the tips of the lens shape detecting units 50L and 50R. The tracing stylus 51F comes in contact with the front surface of an eyeglass lens LE. The tracing stylus 51R comes in contact with the rear surface the eyeglass lens LE. The lens shape detecting units 50L and 50R are supported to be slidable in the Z-axis direction.

The driving mechanism 55 is used to cause the lens shape detecting units 50L and 50R to move in the Z-axis direction. For example, the rotation driving of a motor (not shown) in the driving mechanism 55 is transmitted to the lens shape detecting units 50L and 50R via a rotation transmitting mechanism such as a gear. Accordingly, the tracing styluses 51R and 51R located at the evacuated position moves to the eyeglass lens LE, and a measuring pressure for pressing the tracing styluses 51F and 51R against the eyeglass lens LE. The configuration for pressing the tracing styluses 51F and 51R is not limited to this configuration. For example, a configuration in which the tracing styluses 51F and 51R are pressed using a spring can be used.

When detecting the front surface position of the eyeglass lens LE, the spindle support unit 30 is made to move in the Y-axis direction while rotating the eyeglass lens LE on the basis of the target lens shape, and the position (the position of the front lens surface on the target lens shape) in the X-axis direction of the front lens surface is detected by an encoder (not shown). Regarding the rear lens surface, the position of the rear surface is detected in the same way as detecting the position of the front lens surface.

<Controller>

Figure 7:
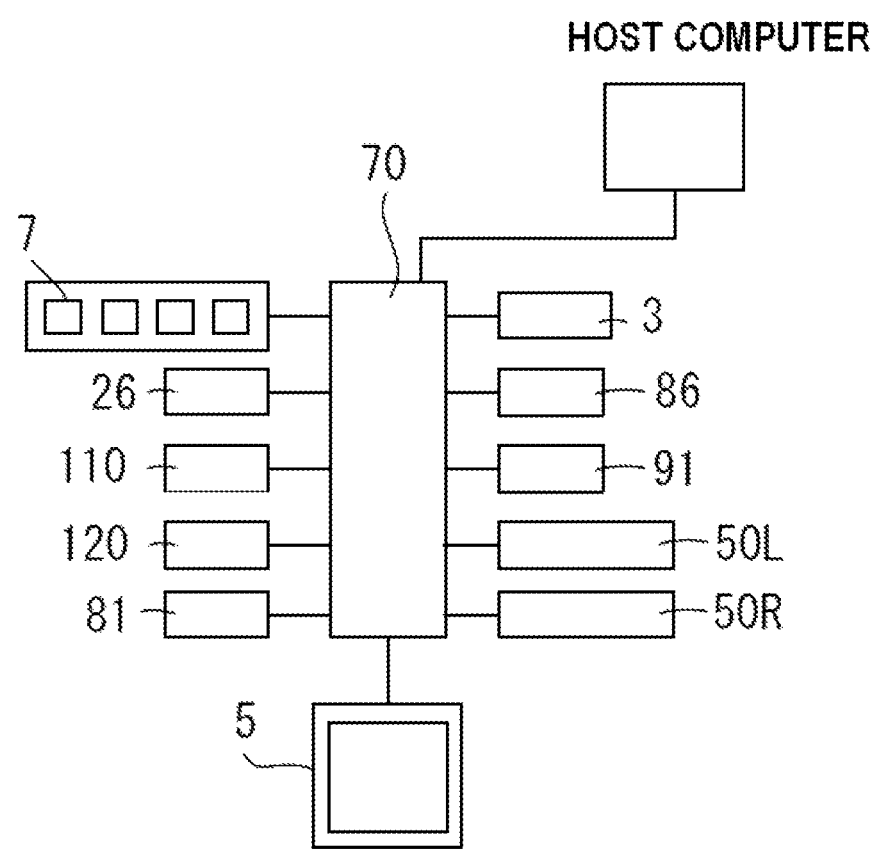
FIG. 7 is a control block diagram of the eyeglass lens processing apparatus.

FIG. 7 is a control block diagram of the eyeglass lens processing apparatus. The motor 26, the motor 110, the motor 120, the motor 81, the motor 86, the motor 91, a motor (not shown) installed in each spindle, a pressure driving source (not shown), and the lens shape detecting units 50L and 50R are connected to the controller 70.

A display 5 having a touch panel function for inputting processing condition data, a switch unit 7 provided with a processing start switch and the like, a memory 3, a host computer, and the like are connected to the controller 70.

<Control Operation>

The control operation of the eyeglass lens processing apparatus 1 in this example will be described below. The processing of an eyeglass lens is performed by selecting various processing steps depending on the processing condition data such as a target lens shape input from the host computer. In the following description, a roughing process and a finishing process will be exemplified as various processing steps.

First, an eyeglass lens is conveyed to the eyeglass lens processing apparatus 1 by a conveyer system (not shown). The conveyer system causes the lens chuck shafts 22L and 22R to chuck the eyeglass lens. When the eyeglass lens is chucked, the controller 70 starts processing the eyeglass lens in the processing steps on the basis of previously-input lens data of the target lens shape.

Figure 8A:
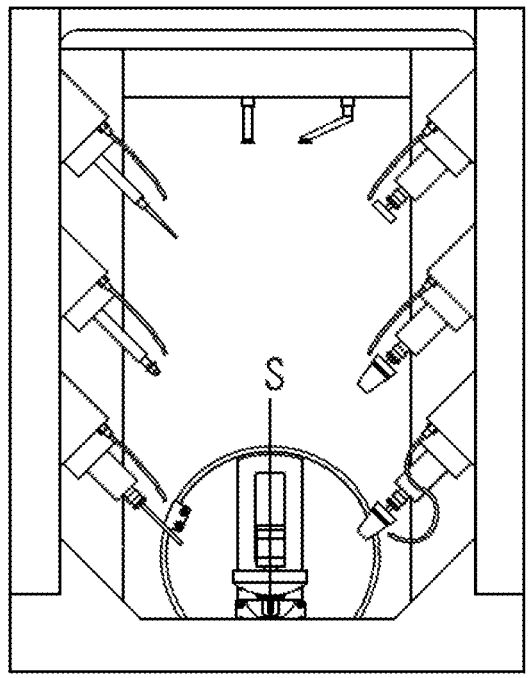
FIGS. 8A to 8D are diagrams illustrating the driving operation of the eyeglass lens processing apparatus when processing an eyeglass lens.
Figure 8B:
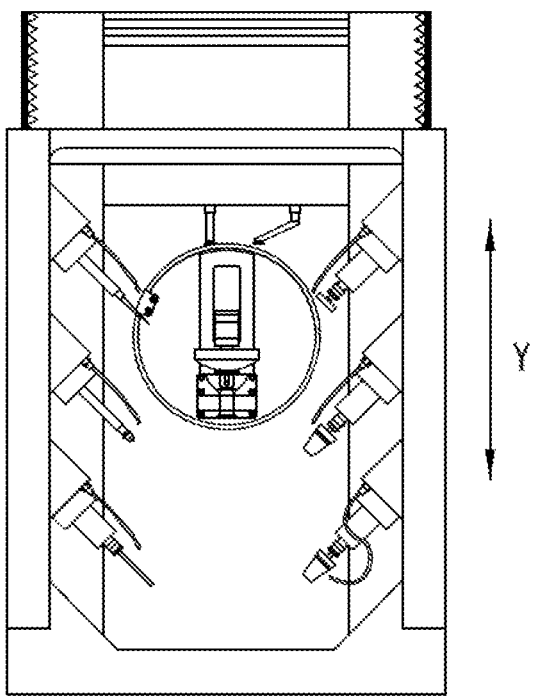
Figure 8C:
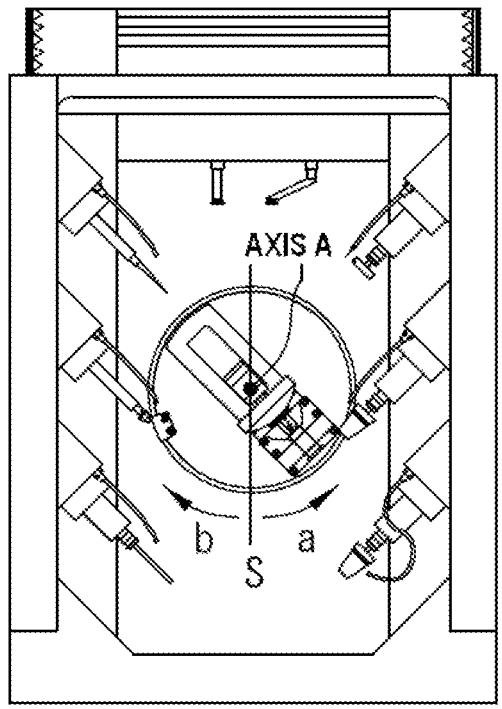
Figure 8D:
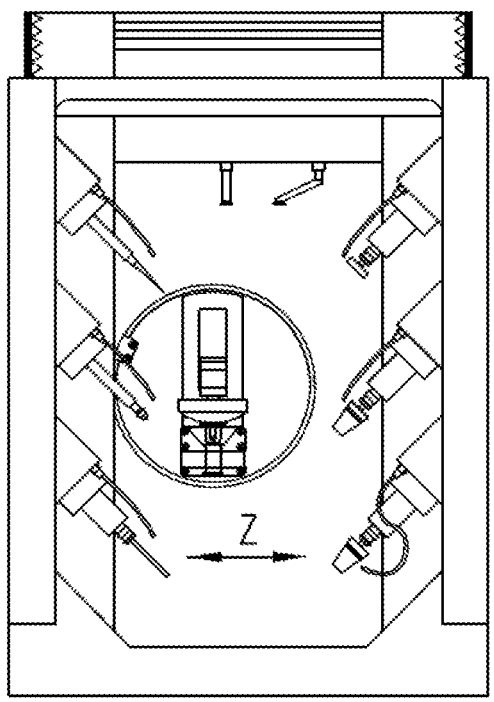

FIGS. 8A to 8C are diagrams illustrating the driving operation of the eyeglass lens processing apparatus 1 at the time of processing an eyeglass lens. FIG. 8A is a diagram illustrating the positional relationship (initial position) of the eyeglass lens processing apparatus 1 before and after starting the processing when setting or taking out an eyeglass lens. S (dotted line) represents the initial position of the lens chuck shaft 22 when starting the processing. The initial position in the Y-axis direction is the highest position of the driving range in the Y-axis direction. The initial position in the Z-axis direction is the middle position of the driving range in the Z-axis direction. The initial position in the X-axis direction is the forefront position of the driving range in the X-axis direction. The initial position is not limited to the above-mentioned position. The initial position only has to be in the driving range of the eyeglass lens processing apparatus 1. An examiner may arbitrarily set the initial position.

First, the positions of the front lens surface and the rear lens surface are detected by the lens shape detecting units 50L and 50R to acquire lens shape data. The controller 70 drives the motor 81 to cause the lens chuck unit 20 to retreat in the X-axis direction. Subsequently, the controller 70 drives the motor 91 to cause the spindle support unit 30 to move in the Y-axis direction (see FIG. 8B). At the time of movement in the Y-axis direction, the controller 70 drives the motor 26 to cause the carriage 21 to rotate about the A axis and to change the shaft angle of the lens chuck shaft 22. For example, as shown in FIG. 8C, the controller 70 causes the lens chuck shaft 22 to rotate about the A axis by a predetermined angle in the direction (counterclockwise direction) from the initial position S. The lens chuck shaft may be made to rotate by a predetermined angle in the b direction (clockwise direction). The controller 70 drives the motor 86 to cause the lens chuck shaft to move in the Z-axis direction (see FIG. 8D).

Figure 9A:
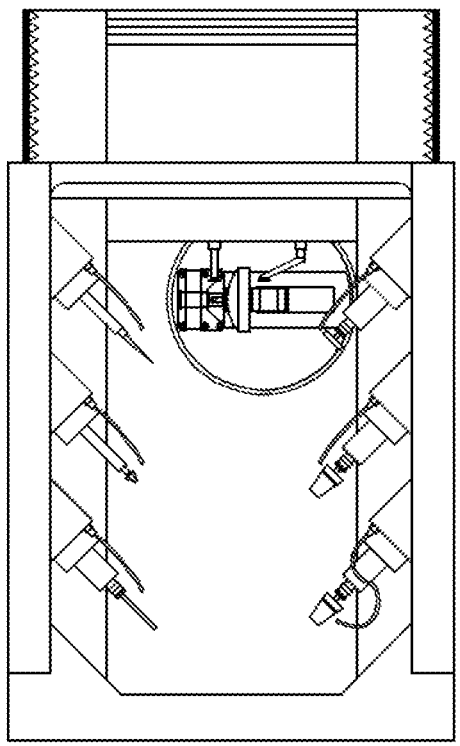
FIGS. 9A to 9C are diagrams illustrating the positional relationship after position adjustment in the Y-axis and Z-axis directions and adjustment of the lens chuck shaft.
Figure 9B:
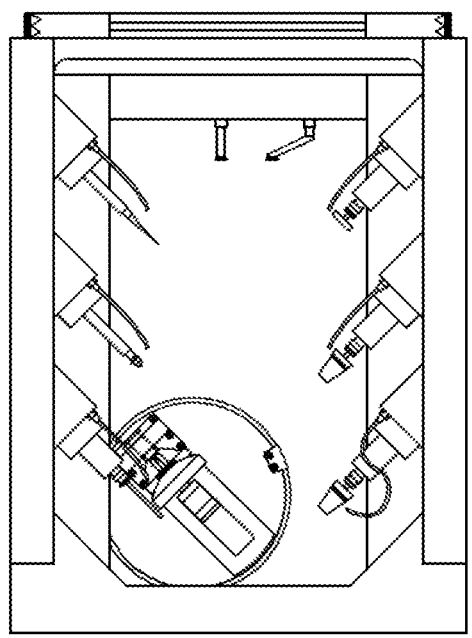
Figure 9C:
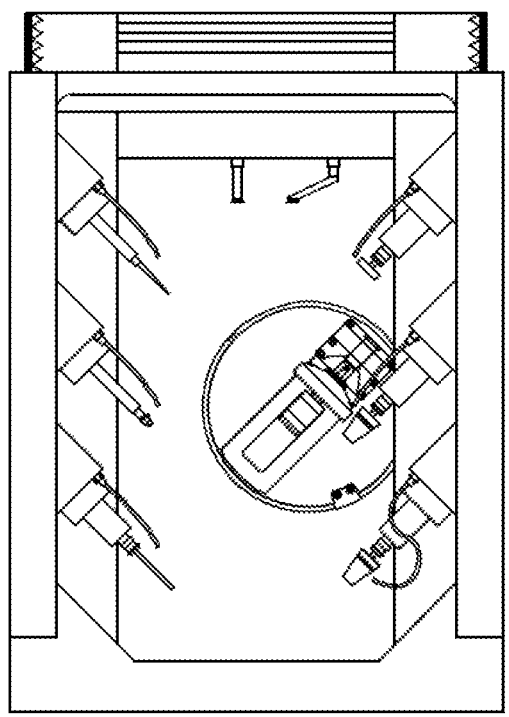

FIGS. 9A to 9C are diagrams illustrating the position adjustment in the Y-axis and Z-axis direction and the positional relationship of the lens chuck shaft 22 after adjustment. The controller 70 adjusts the positions in the Y-axis and Z-axis directions and the shaft angle of the lens chuck shaft 22 so that the eyeglass lens LE is located at the positions of the lens shape detecting units 50L and 50R (see FIG. 9A). At this time, for example, the controller 70 rotates (changes) the shaft angle of the lens chuck shaft 22 by 270° in the a direction (90° in the b direction) from the initial position S.

After adjusting the positions in the Y-axis and the Z-axis directions and the shaft angle of the lens chuck shaft 22, the controller 70 drives the motor 81 to cause the lens chuck unit 20 to go ahead in the X-axis direction. In this way, when the eyeglass lens LE is located at the positions of the lens shape detecting units 50L and 50R, the controller 70 controls the rotational driving and the driving in the Y-axis direction of the lens chuck shaft 22 to acquire lens shape data.

Subsequently the controller 70 performs processing of the eyeglass lens LE by the use of the processing tools. When the processing is performed using the processing tools, the lens chuck shaft 22 is made to rotate by a predetermined angle so that the front lens surface face the bases of the processing tools.

<Roughing>

When a roughing process is performed, the controller 70 drives the motor 81 to cause the lens chuck unit 20 to retreat in the X-axis direction. In the same way as described above, the controller 70 adjusts the positions in the Y-axis and Z-axis directions and the shaft angle of the lens chuck shaft 22 so that the eyeglass lens LE is located at the position of the processing tool 60*a* for roughing (see FIG. 9B). At this time, for example, the controller 70 changes the shaft angle of the lens chuck shaft 22 about the A axis by 45° in the b direction from the shaft angle when the lens shape data is acquired. The changing of the shaft angle is not limited to this description. The shaft angle has only to be changed so that the eyeglass lens LE is located at the position of the processing tool 60a for roughing. For example, the lens chuck shaft 22 may be first returned to the initial position S and then may be rotated by 225° in the a direction.

The controller 70 tilts the lens chuck shaft 22 so that the lens chuck shaft 22 is parallel to the spindle 45a, and controls the driving in the Y-axis direction and the Z-axis direction on the basis of the target lens shape. Alternatively, the lens chuck shaft 22 is tilted so as for the spindle 45a to be parallel to the normal direction of the front curve of the eyeglass lens LE, and the driving in the Y-axis direction and the Z-axis direction is controlled on the basis of the target lens shape so that the eyeglass lens is located within the processing range of the roughing tool 60a. In this example, the lens chuck shaft 22 is tilted so that the lens chuck shaft 22 is parallel to the spindle 40a, and the driving in the Y-axis direction and the Z-axis direction is controlled on the basis of the target lens shape. When the eyeglass lens LE is located at the position of the processing tool 60a, the controller 70 drives the driving source (not shown) and drives the spindle 40a to cause the processing tools to rotate coaxially. The controller 70 controls the driving in the Y-axis direction and the Z-axis direction on the basis of the target lens shape to perform the roughing process.

<Finishing>

Subsequently, the controller 70 performs a finishing process. The controller 70 drives the motor 81 to cause the lens chuck unit 20 to retreat in the X-axis direction. In the same way as described above, the controller 70 adjusts the positions in the Y-axis and Z-axis directions and the shaft angle of the lens chuck shaft 22 so that the eyeglass lens LE is located at the position of the processing tool 65b for finishing (see FIG. 9C).

At this time, for example, the controller 70 changes the shaft angle of the lens chuck shaft 22 about the A axis by 90° in the b direction from the shaft angle for the roughing process. The changing of the shaft angle may be performed by first returning the lens chuck shaft to the initial position S and then causing the lens chuck shaft 22 to rotate by 135° in the a direction. That is, the controller 70 can switch the processing tools to be used for the processing by changing the shaft angle of the lens chuck shaft about the A axis.

The controller 70 sets the lens chuck shaft 22 to be parallel to the conical processing surface of the processing tool 65b. Alternatively, when an edge has a tapered shape (the end becomes thinner), the controller 70 may tilt the lens chuck shaft 22 so as to be oblique about the conical processing surface depending on the taper angle. Then, the finishing process is performed.

For example, in the bevel-finishing process, the controller 70 controls the driving in the Y-axis direction and the Z-axis direction to locate a predetermined position of an edge after the roughing process at a beveling groove of the processing tool 65b on the basis of the bevel path (which is obtained through a predetermined calculating operation based on the edge thickness of the eyeglass lens). The controller 70 changes the shaft angle of the lens chuck shaft 22 about the A axis along the lens curve or the bevel curve, and controls the rotational driving of the shaft angle of the lens chuck shaft 22 to locate a predetermined position of the edge after the roughing process at the bevel groove of the processing tool 65b.

In the flat-finishing process, the controller 70 controls the driving in the Y-axis direction and the Z-axis direction on the basis of the target lens shape so that the edge after the roughing process is located on the flat-finishing surface of the processing tool. The controller 70 changes the shaft angle of the lens chuck shaft 22 about the A axis so to be oblique about the conical processing surface by a predetermined angle or to be perpendicular to the front curve of the eyeglass lens LE, and controls the rotational driving of the shaft angle of the lens chuck shaft 22.

When the eyeglass lens LE is located at the position of the processing tool 65b, the controller 70 drives the driving source (not shown) to rotationally drive the spindle 45b and to cause the processing tools to rotate coaxially therewith. The controller 70 controls the driving in the Y-axis direction and the Z-axis direction and the driving of the shaft angle of the lens chuck shaft 22 on the basis of the target lens shape to perform the finishing process.

In this example, the processing tool 65b is also used as a processing tool for chamfering. In this case, the flat-finishing surface is also used as a chamfering surface. The controller 70 controls the tilt angle of the lens chuck shaft 22 on the basis of the chamfering angle. That is, the controller 70 performs a chamfering process by controlling the driving in the Y-axis direction and the Z-axis direction on the basis of the chamfering path (which is obtained through a predetermined calculating operation based on the position of the front lens surface (front edge) and the position of the rear lens surface (rear edge)). In this case, the controller 70 changes the shaft angle of the lens chuck shaft 22 by 180° in the a direction or the b direction to switch the front surface and the rear surface of the eyeglass lens to be processed by the processing tool 65b. In this way, by changing the shaft angle of the lens chuck shaft 22, it is possible to perform the chamfering process on the front surface and the rear surface of the eyeglass lens through the use of a single processing tool.

<Polishing>

Subsequently, the controller 70 performs a polishing process. The controller 70 drives the motor 81 to cause the lens chuck unit 20 to retreat in the X-axis direction. The controller 70 adjusts the positions in the Y-axis direction and the Z-axis direction and the shaft angle of the lens chuck shaft 22 in the same way as performed in the roughing and finishing processes, so that the eyeglass lens LE is located at the position of the processing tool 65a for polishing.

The polishing process is performed under the same control as described above in the finishing process. When the eyeglass lens LE is located at the position of the processing tool 65b, the controller 70 drives the driving source (not shown) to rotationally drive the spindle 45b and to cause the processing tools to rotate coaxially therewith. Then, the controller 70 controls the driving in the Y-axis direction and the Z-axis direction and the shaft angle of the lens chuck shaft 22 on the basis of the target lens shape to perform the polishing process. Water is used to perform the polishing process.

<Other Processing>

In other processing processes, the positions in the Y-axis direction and the Z-axis direction and the shaft angle of the lens chuck shaft 22 are adjusted so as to locate the eyeglass lens LE at the positions of the processing tools, in the same way as described above.

For example, in the grooving process, the controller 70 performs the flat-finishing process using the processing tool 60b and then controls the driving in the Y-axis direction and the Z-axis direction on the basis of the groove path (which is obtained through a predetermined calculating operation based on the edge thickness of the eyeglass lens) to perform the grooving process.

For example, in the drilling process, the controller 70 causes the front lens surface to face the tip of the processing tool 60c. The controller 70 tilts the lens chuck shaft so as for the shaft of the drilling tool to be parallel to the normal direction at the drilling position on the basis of input drilling position data and a front lens surface shape (which is obtained through lens shape measurement) at the drilling position, and controls the driving in the Y-axis direction and the Z-axis direction to perform the drilling process.

For example, in the stepping process, the controller 70 tilts the lens chuck shaft 22 on the basis of the tilt of the processing tool 65c. Then, the controller 70 controls the driving in the Y-axis direction and the Z-axis direction to perform the stepping process on the basis of the bevel path and an input stepping path (the positional path of the corners of an L shape).

In this way, by employing the configuration in which the processing tools are arranged in the opposite faces and the processing tools are switched by changing the shaft angle of the lens chuck shaft, it is possible to prevent an increase in height of the eyeglass lens processing apparatus. Accordingly, it is possible to easily perform maintenance (interchange of processing tools or the like) of the eyeglass lens processing apparatus.

By using the driving in the X-axis direction when adjusting the relative positions of the processing tools and the eyeglass lens, it is possible to prevent destruction or breakdown of the apparatus and to perform an efficient control operation for processing. For example, when the processing tools are switched, the lens chuck shaft is made to retreat once in the X-axis direction and then the driving in the Y-axis direction and the Z-axis direction and the shaft angle of the lens chuck shaft 22 are adjusted. Accordingly, it is possible to perform the adjustment in the shortest distance, thereby reducing the necessary time. By causing the lens chuck shaft 22 to retreat and then performing the adjustment, it is possible to prevent interference (contact) of the lens chuck shaft 22 with the processing tools and the like, thereby preventing destruction of breakdown of the apparatus.

Modified Example

The control operation for processing is not limited to the above-mentioned sequence. For example, the roughing process may be first performed, then the lens shape data may be acquired, and the finishing process may be performed. In this case, the controller 70 causes the lens chuck shaft 22 to rotate by 225° in the a direction from the initial position S and performs the roughing process. Thereafter, the controller 70 causes the lens chuck shaft to rotate by 45° in the a direction so as to make the lens chuck shaft horizontal and acquires the lens shape data through the use of the lens shape detecting units 50L and 50R. After acquiring the lens shape data, the controller 70 causes the lens chuck shaft to rotate by 45° in the b direction and to perform the finishing process. An examiner may arbitrarily change the sequence of the control operation. The driving operations of changing the shaft angel of the lens chuck shaft 22 may not be continuously performed, but the lens chuck shaft may be returned to the initial position S for each step (processing or detecting) and then the shaft angle may be changed.

In this example, the lens chuck shaft 22 is rotationally driven in the shaft angle and is driven in the Z-axis direction and the X-axis direction. That is, the lens chuck shaft 22 does not move in the Y-axis direction in which the movement is large. Accordingly, the eyeglass lens chucked by the lens chuck shaft 22 hardly moves from the initial position.

For example, when an inlet and an outlet of an eyeglass lens are disposed at the initial position, the time until the eyeglass lens is returned to the initial position after the processing process is completed is shortened. Accordingly, it is possible to easily interchange an eyeglass lens and thus to improve the processing efficiency of an eyeglass lens.

What is claimed is:

1. An eyeglass lens processing apparatus for processing a periphery of an eyeglass lens, the eyeglass lens processing apparatus comprising:
   a lens chuck shaft configured to chuck the eyeglass lens;
   a first processing tool unit;
   a second processing tool unit;
   a shaft angle changing portion configured to change a shaft angle of an axis of the lens chuck shaft with respect to the first processing tool unit and the second processing tool unit;
   the first processing tool unit including at least two spindles, the first processing tool unit including a first processing tool configured to process the periphery of the eyeglass lens, the periphery of the chucked eyeglass lens able to be provided at each of the at least two spindles of the first processing tool unit, the at least two spindles of the first processing tool unit are arranged side by side such that one of the at least two spindles of the first processing tool unit is vertically higher than the other of the at least two spindles of the first processing tool unit;
   the second processing tool unit includes at least two spindles, the second processing tool unit including a second processing tool configured to process the periphery of the eyeglass lens, the periphery of the chucked eyeglass lens able to be provided at each of the at least two spindles of the second processing tool unit, the at least two spindles of the second processing tool unit are arranged side by side such that one of the at least two spindles of the second processing tool unit is vertically higher than the other of the at least two spindles of the second processing tool unit, wherein the first processing tool unit and the second processing tool unit are on opposite sides of a reference axis extending between the first processing tool unit and the second processing tool unit; and
   a controller configured to change one of the first and second processing tool units to be used for processing the eyeglass lens to the other of the first and second processing tool units by controlling driving of the shaft angle changing portion to change the shaft angle of the lens chuck shaft;
   wherein the controller performs a predetermined processing process by controlling the shaft angle changing portion to adjust the shaft angle of the axis of the lens chuck shaft with respect to the first processing tool unit and the second processing tool unit when processing the eyeglass lens;
   the eyeglass lens processing apparatus further comprising a driver configured to linearly move both the first processing tool unit and the second processing tool unit along the reference axis relative to the shaft angle changing portion,
   wherein the at least two spindles of at least one of the first and the second processing tool units includes at least three spindles which are linearly arranged such that a common vertical axis intersects each of the at least three spindles.

2. The eyeglass lens processing apparatus according to claim 1, wherein the shaft angle changing unit includes a rotating base that supports the lens chuck shaft so as to change the shaft angle of the axis of the lens chuck shaft with respect to the first processing tool unit and the second processing tool unit, and rotates the rotating base around a central axis of the rotating base perpendicular to the axis of the lens chuck shaft.

3. The eyeglass lens processing apparatus according to claim 1, wherein the at least two spindles of the first processing tool unit are symmetrical to the at least two spindles of the second processing tool unit with respect to the reference axis.

4. The eyeglass lens processing apparatus according to claim 3, wherein
the at least two spindles of the first processing tool unit are opposed to the at least two spindles of the second processing tool unit across the reference axis, and
an axis of at least one of the at least two spindles of the first processing tool unit and an axis of at least one of the at least two spindles of the second processing tool unit are tilted about the reference axis.

5. The eyeglass lens processing apparatus according to claim 1, wherein
the spindle arranged at a lowest position among the at least two spindles of each of the first and second processing tool units is provided with a processing tool for roughing.

6. The eyeglass lens processing apparatus according to claim 1, wherein
each spindle arranged at a lowest position among the at least two spindles of the first and second processing tool units is provided with a processing tool configured to be used with water.

7. An eyeglass lens processing apparatus for processing a periphery of an eyeglass lens, the eyeglass lens processing apparatus comprising:
a lens chuck shaft configured to chuck the eyeglass lens;
a first processing tool unit;
a second processing tool unit;
a shaft angle changing portion configured to change a shaft angle of an axis of the lens chuck shaft with respect to the first processing tool unit and the second processing tool unit;
the first processing tool unit including at least two spindles, the first processing tool unit including a first processing tool configured to process the periphery of the eyeglass lens, the periphery of the chucked eyeglass lens being able to be provided at each of the at least two spindles of the first processing tool unit, the at least two spindles of the first processing tool unit are arranged side by side such that one of the at least two spindles of the first processing tool unit is vertically higher than the other of the at least two spindles of the first processing tool unit;
the second processing tool unit includes at least two spindles, the second processing tool unit including a second processing tool configured to process the periphery of the eyeglass lens, the periphery of the chucked eyeglass lens being able to be provided at each of the at least two spindles of the second processing tool unit, the at least two spindles of the second processing tool unit are arranged side by side such that one of the at least two spindles of the second processing tool unit is vertically higher than the other of the at least two spindles of the second processing tool unit, wherein the first processing tool unit and the second processing tool unit are on opposite sides of a reference axis extending between the first processing tool unit and the second processing tool unit; and
a controller configured to change one of the first and second processing tool units to be used for processing the eyeglass lens to the other of the first and second processing tool units by controlling driving of the shaft angle changing portion to change the shaft angle of the lens chuck shaft;
wherein the controller performs a predetermined processing process by controlling the shaft angle changing portion to adjust the shaft angle of the axis of the lens chuck shaft with respect to the first processing tool unit and the second processing tool unit when processing the eyeglass lens;
the eyeglass lens processing apparatus further comprising a driver configured to linearly move both the first processing tool unit and the second processing tool unit along the reference axis relative to the shaft angle changing portion,
wherein the first processing tool is provided to one end of one of the at least two spindles of the first processing tool unit, wherein the second processing tool is provided to one end of one of the at least two spindles of the second processing tool unit,
wherein the spindle to which the first processing tool is provided rotates the first processing tool about a first rotational axis, and the spindle to which the second processing tool is provided rotates the second processing tool about a second rotational axis, and wherein the first and second rotational axes of the respective spindles for the first and the second processing tools are inwardly inclined relative to the reference axis such that the rotational axes intersect a vertical plane between the first and the second processing tools containing the reference axis, and
wherein the one end of the spindle to which the first processing tool is provided is the end of the respective spindle that is most proximate to the vertical plane, and wherein the one end of the spindle to which the second processing tool is provided is the end of the respective spindle that is most proximate to the vertical plane.

* * * * *